United States Patent [19]

Acre et al.

[11] 4,150,735
[45] Apr. 24, 1979

[54] SLACK ADJUSTER ASSEMBLY

[75] Inventors: Leon R. Acre, Ovid; Marquis J. Lake, Sr., Corunna, both of Mich.

[73] Assignee: Midland-Ross Corporation, Cleveland, Ohio

[21] Appl. No.: 774,231

[22] Filed: Mar. 4, 1977

[51] Int. Cl.² ............................................. F16D 65/52
[52] U.S. Cl. ......................... 188/196 BA; 188/79.5 K
[58] Field of Search .................. 188/79.5 GE, 79.5 K, 188/196 BA

[56] References Cited

U.S. PATENT DOCUMENTS

| | | | |
|---|---|---|---|
| 1,525,568 | 2/1925 | Chapin | 188/196 BA |
| 2,109,284 | 2/1938 | Brinck et al. | 188/196 BA |
| 2,650,681 | 9/1953 | Shively | 188/196 BA |
| 3,013,638 | 12/1961 | Satrum | 188/79.5 K |
| 3,154,178 | 10/1964 | House et al. | 188/196 BA |
| 3,526,303 | 9/1970 | Lodjic et al. | 188/79.5 K |
| 3,921,765 | 11/1975 | Swander | 188/79.5 K |
| 3,968,864 | 7/1976 | Deichsel et al. | 188/196 BA |
| 4,015,692 | 4/1977 | Mathews | 188/196 BA |

*Primary Examiner*—Edward R. Kazenske
*Attorney, Agent, or Firm*—H. Duane Switzer

[57] ABSTRACT

A slack adjuster assembly for brakes includes a slack arm, ratchet wheel and pawl carrier all rotatable about a common axis in unison and relative to one another. The parts rotate in unison during normal operation when the slack arm rotates back and forth in brake apply and brake release directions. When an adjustment is required due to brake wear, the slack arm will overtravel in the brake apply direction. When overtravel occurs, rotation of the pawl carrier with the slack arm and ratchet wheel through the overtravel portion of the stroke is stopped to effect relative rotation between the pawl carrier and the ratchet wheel. Upon return of the slack arm in the brake release direction from an overtravel stroke, the pawl carrier is rotated relative to the slack arm and rotatably drives the ratchet wheel relative to the slack arm.

3 Claims, 5 Drawing Figures

SLACK ADJUSTER ASSEMBLY

BACKGROUND OF THE INVENTION

This application relates to the art of slack adjusters and, more particularly, to automatic slack adjusters for adjusting vehicle brakes. Although the invention will be particularly described with reference to adjustment of vehicle brakes, it will be recognized that the slack adjuster assembly may be used for adjusting other devices.

One type of vehicle brake is operated by rotating a slack arm back and forth in brake apply and brake release directions to rotate a cam shaft which cooperates with brake shoes for moving same between engaged and disengaged positions. As the lining on the brake shoes wears, it is necessary to rotate the cam shaft to a new position relative to the slack arm for achieving a maximum braking force when the slack arm moves through a predetermined stroke. The most common mechanism for rotatably adjusting the cam shaft relative to the slack arm includes a worm wheel drivingly connected to the cam shaft, and positioned between the cam shaft and the slack arm. A worm gear carried by the slack arm engages the worm wheel for rotating same in unison with the slack arm during normal operation. A reciprocating mechanism is operative upon overtravel of the slack arm to rotate the worm gear relative to the slack arm for rotatably driving the worm wheel and cam shaft relative to the slack arm to a new adjusted position. Mechanisms of this type are relatively expensive and complicated due to the use of worm gears and worm wheels. It would be desirable to have a mechanism for effecting an adjustment without requiring the use of worm gears and worm wheels, along with the relatively complicated and expensive reciprocating mechanism for driving the worm gear.

SUMMARY OF THE INVENTION

A slack adjuster assembly for brakes includes a slack arm and ratchet wheel rotatable together during normal operation through a predetermined stroke. Adjusting means effects relative rotation between the slack arm and ratchet wheel for adjusting same upon overtravel thereof beyond the predetermined stroke. In accordance with the invention, the adjusting means includes a pawl carrier having a pawl engaging the ratchet wheel. The pawl carrier is rotatable with the slack arm and ratchet wheel during normal operation thereof through the predetermined stroke, and is rotatable relative to the slack arm for adjustably rotating the ratchet wheel relative to the arm in response to overtravel of the slack arm beyond its predetermined stroke.

In the preferred arrangement, the pawl carrier and pawl are rotatable relative to the slack arm and ratchet wheel in one direction upon overtravel of the slack arm beyond its predetermined stroke and are rotatable relative to the slack arm in an opposite direction to rotatably drive the ratchet wheel relative to the slack arm upon return of the slack arm from its overtravel.

In one arrangement, the adjusting means includes abutment means reciprocable relative to the pawl carrier for rotating the carrier and ratchet wheel relative to the slack arm upon overtravel of the slack adjuster assembly. The abutment means may include a stop and an abutment spaced from one another, with the carrier having a projection extending therebetween. The stop and abutment are reciprocable relative to the projection through a distance which is insufficient to move the carrier by engagement with the projection during normal operation of the assembly. Upon overtravel of the assembly, the stop is engageable with the projection to hold the carrier against overtravel movement thereof with the slack arm and ratchet wheel. Upon return of the slack arm from overtravel, the abutment is engageable with the projection to provide relative rotation of both the carrier and ratchet wheel relative to the slack arm.

A push rod is pivotally connected to the slack arm by a first pivot connection and the abutment means is pivotally connected to the push rod by a second pivot connection spaced beyond the first pivot connection. During rotatable movement of the slack arm in brake apply and brake release directions, the second pivot connection is movable about the first pivot connection to impart generally reciprocating movement to the abutment means relative to the carrier. Clearance varying means is provided for varying the position of the abutment means relative to the carrier to vary the length of the predetermined stroke through which the slack arm rotates before operation of the adjustment means by engagement between the abutment means and carrier.

It is a principal object of the present invention to provide an improved slack adjuster assembly for brakes.

It is a further object of the invention to provide an improved slack adjuster assembly which is simpler and more economical to manufacture and assemble.

It is also an object of the invention to provide a slack adjuster assembly which can be easily adjusted to vary the length of the stroke through which the assembly moves before an adjustment is effected.

DESCRIPTION OF A PREFERRED EMBODIMENT

Figure 1:
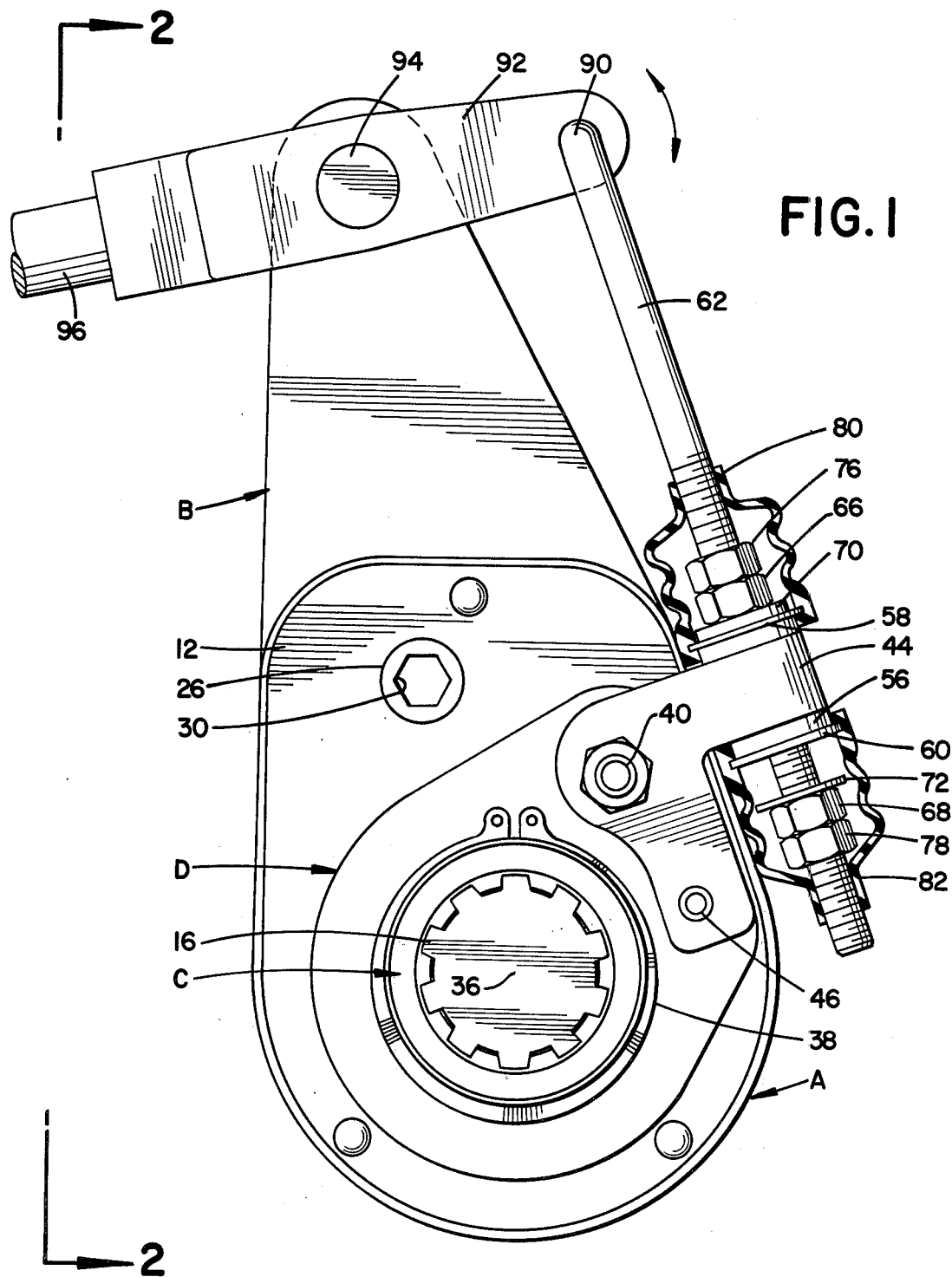
FIG. 1 is a side elevational view of a slack adjuster assembly constructed in accordance with the present invention.

With reference to the drawing, FIG. 1 shows a slack arm assembly A including a slack arm B having a ratchet wheel C rotatably mounted therein and retained as by side plates 12 suitably riveted or otherwise secured to slack arm B. Ratchet wheel C has a splined central hole receiving a cooperating splined end portion of a rotatable brake actuation shaft 16 having a cam on its other end positioned between a pair of brake shoes for expanding the brake shoes outwardly to a brake engaged position upon rotation of the shaft 16 in one direction, and allowing the brake shoes to retract inwardly upon rotation of the shaft 16 in the opposite direction.

Figures 2, 3:
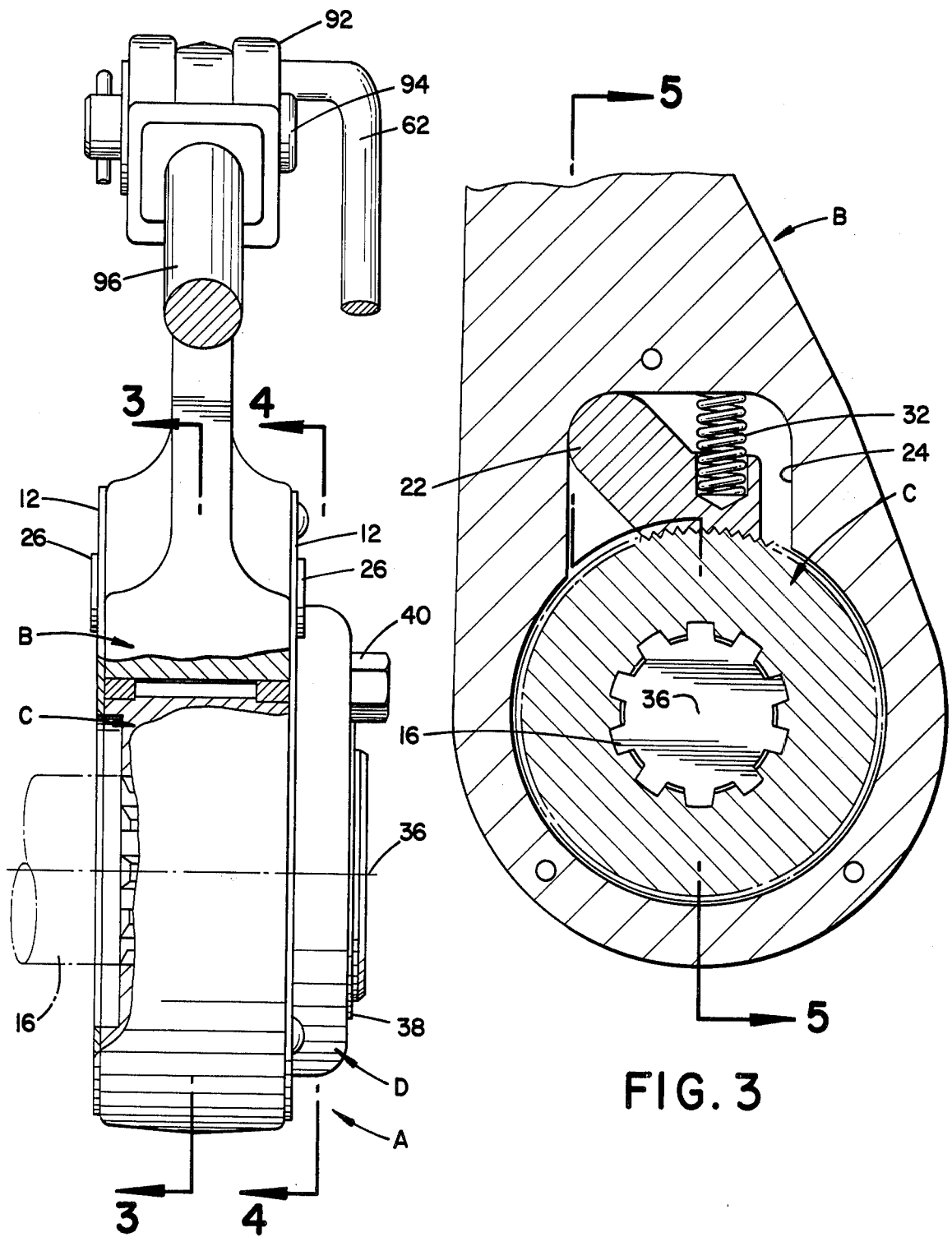
FIG. 2 is a rear elevational view taken generally on line 2—2 of FIG. 1 and with portions cut away for clarity of illustration.
FIG. 3 is a partial cross-sectional elevational view taken generally on line 3—3 of FIG. 2.

A first pawl 22 is positioned in a cavity 24 in slack arm B and has cylindrical projections 26 extending through suitable circular holes in plates 12. One projection 26 has a hexagonal socket 30 for receiving a wrench to manually rotate pawl 22 to a released position against the biasing force of spring 32 which normally biases first pawl 22 in a clockwise direction in FIG. 3 into engagement with ratchet wheel C. Slack arm B and ratchet wheel C are rotatable about a common axis 36. In FIG. 3, ratchet wheel C can rotate clockwise relative to slack arm B by ratcheting past first pawl 22. Likewise, slack arm B can rotate counterclockwise relative to ratchet wheel C because first pawl 22 will ratchet past ratchet wheel C. Clockwise rotation of slack arm B provides a driving force through first pawl 22 to ratchet wheel C for rotating same with slack arm B. Counterclockwise rotation of ratchet wheel C in FIG. 3 will also drive slack arm B in the same direction through first pawl 22.

Figure 4:
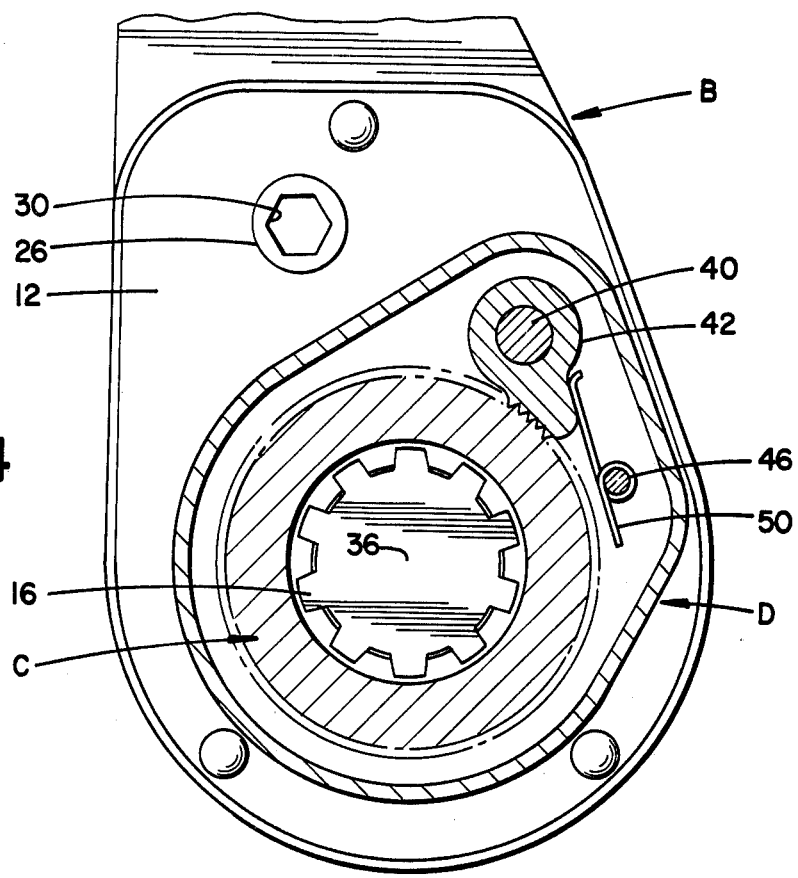
FIG. 4 is a partial cross-sectional elevational view taken generally on line 4—4 of FIG. 2.
Figure 5:
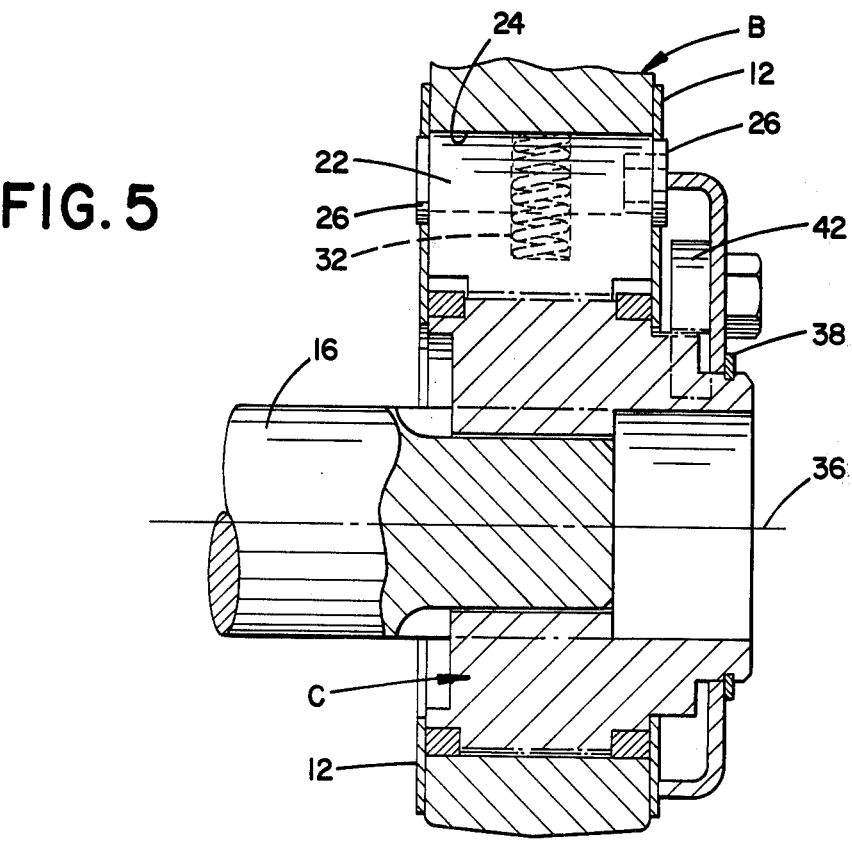
FIG. 5 is a cross-sectional elevational view taken generally on line 5—5 of FIG. 3.

A shallowly dished housing member defines a second pawl carrier D positioned on a hub portion of ratchet wheel C and retained in position thereon by a snap ring 38. A rivet 40 pivotally mounts a second pawl 42 to pawl carrier D and also secures a bracket 44 thereto. A pin 46 aids in securing bracket 44 to pawl carrier D and also mounts a spring 50 which normally biases second pawl 42 in a clockwise direction about rivet 40 as viewed in FIG. 4. Pawl carrier D is also rotatable about axis 36. Clockwise rotation of ratchet wheel C in FIG. 4 will allow same to ratchet past second pawl 42. Likewise, counterclockwise rotation of pawl carrier D will allow second pawl 42 to ratchet past ratchet wheel C. Counterclockwise rotation of ratchet wheel C or clockwise rotation of pawl carrier D provides driving force between the two parts through second pawl 42.

Bracket 44 has a hollow cylindrical portion receiving a block 56 having opposite abutments 58 and 60. A suitable longitudinal hole through block 56 freely receives rod 62 for reciprocating movement relative thereto. The lower end portion of rod 62 is threaded, and receives adjustment nuts 66 and 68 having washers secured thereto to define abutments 70 and 72. Abutment 72 may also be considered a stop. Lock nuts 76 and 78 are provided for retaining the adjustment nuts in their adjusted positions, and flexible boots 80 and 82 cover the adjustment nuts for eliminating dirt therefrom. The upper end of rod 62 is pivotally connected as at a pivot point 90 to a bifurcated yoke 92 also pivotally connected to slack arm B as at pivot point 94. Yoke 92 is suitably connected by a push rod 96 to an air chamber which selectively supplies a pushing force to rod 96 for rotating slack arm B in a clockwise direction.

When the conventional air motor is energized for applying a pushing force to the push rod 96, slack arm B is rotated clockwise for rotating shaft 16 clockwise to apply vehicle brakes. This rotation is transmitted from slack arm B through first pawl 22 to ratchet wheel C and then to shaft 16 through the splined connection. In view of the fact that there is nothing holding pawl carrier D against rotation, the engagement between second pawl 42 and ratchet wheel C is sufficient to rotate pawl carrier D with ratchet wheel C and slack arm B in the clockwise direction. At the same time all of the parts are rotating in unison about axis 36, pivot point 90 is moving upwardly relative to pivot point 94. This strokes rod 62 upwardly so that stop 72 moves upwardly toward abutment 60. During normal operation, slack arm B rotates through a predetermined stroke and stop 72 never engages abutment 60 or engages same very lightly. If the brakes are worn and require adjustment, slack arm B will rotate beyond the normal predetermined stroke and engagement between abutment 60 and stop 72 will cause relative rotation of pawl carrier D in a counterclockwise direction with respect to slack arm B. As viewed in FIG. 4, second pawl 42 will simply ratchet past ratchet wheel C in a counterclockwise direction to occupy a new position thereon. When slack arm B then rotates back in the brake release direction, abutment 58 will engage abutment 70 to effect clockwise rotation of pawl carrier D relative to slack arm B. The engagement of second pawl 42 with ratchet wheel C will also effect clockwise rotation of ratchet wheel C and shaft 16 relative to slack arm B for adjusting the brakes by rotating the cam carried by the opposite end of shaft 16 to a new position relative to the brake shoes.

During normal operation of the slack adjuster assembly, the slack arm, ratchet wheel and pawl carrier all rotate in unison about a common axis. In order to effect an adjustment, relative rotation between these parts occurs about the same axis. The slack arm assembly rotates back and forth in brake apply and brake release directions through a normal predetermined stroke. Once the slack arm moves beyond the predetermined stroke to an overtravel position, an adjustment occurs by relative rotation between the pawl carrier and ratchet wheel, and then between the pawl carrier and ratchet wheel relative to the slack arm. Stop 72 and abutment 70 are reciprocable relative to a pawl carrier projection defined by bracket 44. Reciprocation normally takes place over a predetermined distance which is insufficient to move the pawl carrier by engagement of the projection with the stop. However, upon overtravel of the slack adjuster assembly, stop 72 engages abutment 60 to effect relative rotation of pawl carrier D relative to ratchet wheel C and slack arm B in one direction. When the slack arm moves back in the brake release direction, engagement between abutments 58 and 70 effects rotation of pawl carrier D in the opposite direction to drive ratchet wheel C therewith relative to slack arm B. Abutments 70 and 72 reciprocate in generally opposite directions with respect to the rotational direction of slack arm B. For example, when slack arm B and the other parts are rotating clockwise in FIG. 1, abutments 70 and 72 are moving upwardly in a generally counterclockwise direction. Likewise, when slack arm B is rotating in a counterclockwise direction, abutments 70 and 72 are moving downwardly in a generally clockwise direction.

Adjustability of adjustment nut 68 and its stop washer 72 along the threaded lower end portion of rod 62 defines a clearance varying means for selectively varying the clearance between abutment 60 and stop 72. Variation of this clearance will vary the predetermined stroke through which the slack adjuster assembly rotates in the brake apply direction before an adjustment is effected. The adjusting means for adjusting the slack adjuster assembly includes pawl carrier D and second pawl 42 along with its cooperation with ratchet wheel C. Bracket 44 along with stops 58, 60, 70 and 72 also form part of the adjusting means which effects an adjustment of the mechanism.

Abutments 70 and 72 in effect define abutment means which reciprocates relative to carrier D for rotating carrier D and ratchet wheel C relative to slack arm B upon overtravel of the slack adjuster assembly.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A slack adjuster mechanism for brakes comprising; a one-piece unitary ratchet wheel mountable on a shaft for rotation therewith about an axis, a slack arm mounted on said ratchet wheel for rotation relative thereto about said axis, a pawl carrier mounted directly on said ratchet wheel on one side of said slack arm for rotation relative to said ratchet wheel and slack arm about said axis, a first pawl positioned between said slack arm and ratchet wheel for normally rotating said ratchet wheel with said slack arm through a normal predetermined stroke between brake released and brake applied positions, a second pawl positioned between said pawl carrier and ratchet wheel for normally providing rotation of said pawl carrier with said ratchet wheel and slack arm through said predetermined stroke, a push rod pivotally connected to said slack arm by a first pivot connection for moving said slack arm through said predetermined stroke, abutment means pivotally connected to said push rod by a second pivot connection spaced beyond said first pivot connection between said push rod and slack arm, said second pivot connection during rotatable movement of said slack arm being movable about said first pivot connection to impart generally reciprocating movement to said abutment means relative to said carrier, and said carrier having a carrier abutment cooperating with said abutment means upon movement of said slack arm and ratchet wheel beyond said predetermined stroke toward an overtravel position for stopping rotation of said pawl carrier beyond said predetermined stroke while effecting rotational movement of said slack arm and ratchet wheel in one direction relative to said pawl carrier as said slack arm and ratchet wheel rotate past said predetermined stroke toward said overtravel position, and said carrier abutment cooperating with said abutment means upon return of said slack arm from said overtravel position toward said brake released position for stopping rotation of both said pawl carrier and ratchet wheel before said slack arm reaches said brake released position while effecting rotational movement of said slack arm opposite to said one direction relative to both said ratchet wheel and pawl carrier as said slack arm continues rotation toward said brake released position to adjust the slack in said mechanism and limit the travel of said slack arm to said predetermined stroke.

2. The slack adjuster assembly of claim 1 including clearance varying means for varying the position of said abutment means relative to said carrier abutment and thereby varying the length of the predetermined stroke through which said slack arm rotates before adjustment of said mechanism by cooperation of said abutment means and carrier abutment.

3. The slack adjuster assembly of claim 1 wherein said abutment means includes a spaced stop and adjusting abutment and said carrier abutment comprises a carrier projection extending between said stop and adjusting abutment, said stop being engageable with said carrier projection upon overtravel of said slack arm and said adjusting abutment being engageable with said carrier projection upon return of said slack arm from an overtravel stroke, and said stop being adjustable toward and away from said adjusting abutment to vary the clearance between said carrier projection and stop and thereby vary the length of the predetermined stroke through which said slack arm travels before engagement thereof by said stop.

* * * * *